US012731935B2

(12) United States Patent
Szymura et al.

(10) Patent No.: US 12,731,935 B2
(45) Date of Patent: Sep. 8, 2026

(54) PLUG CONNECTOR PLUG HAVING AN INCREASED VIBRATORY STRENGTH

(71) Applicant: Amphenol-Tuchel Electronics GmbH, Heilbronn (DE)

(72) Inventors: Dawid Szymura, Eppingen-Richen (DE); Martin Dörr, Leingarten (DE)

(73) Assignee: AMPHENOL-TUCHEL ELECTRONICS GMBH, Heilbronn (DE)

( * ) Notice: Subject to any disclaimer, the term of this patent is extended or adjusted under 35 U.S.C. 154(b) by 284 days.

(21) Appl. No.: 18/549,661

(22) PCT Filed: Mar. 15, 2022

(86) PCT No.: PCT/EP2022/056687
§ 371 (c)(1),
(2) Date: Sep. 8, 2023

(87) PCT Pub. No.: WO2022/200125
PCT Pub. Date: Sep. 29, 2022

(65) Prior Publication Data

US 2024/0162646 A1 May 16, 2024

(30) Foreign Application Priority Data

Mar. 24, 2021 (DE) ......................... 102021107308.1

(51) Int. Cl.
*H01R 13/426* (2006.01)
*H01R 13/533* (2006.01)

(52) U.S. Cl.
CPC ......... *H01R 13/426* (2013.01); *H01R 13/533* (2013.01)

(58) Field of Classification Search
CPC ............................ H01R 13/426; H01R 13/533
(Continued)

(56) References Cited

U.S. PATENT DOCUMENTS 3,763,460 A * 10/1973 Hatschek ............. H01R 13/533 439/675
5,131,857 A * 7/1992 Gmelin ................ F02M 51/005 123/456

(Continued)

FOREIGN PATENT DOCUMENTS

DE 4320491 A1 12/1994
DE 9418669 U1 3/1996

(Continued)

OTHER PUBLICATIONS

International Search Report & Written Opinion for International Application No. PCT/EP2022/056687; International Filing Date: Mar. 15, 2022; Date of Mailing: Jun. 29, 2022; 11 pages.

*Primary Examiner* — Harshad C Patel
(74) *Attorney, Agent, or Firm* — CANTOR COLBURN LLP

(57) ABSTRACT

The invention relates to a plug connector plug for a plug connector having an increased vibratory strength, comprising a plug connector plug housing with at least one contact element which is introduced into a receiving chamber of the plug connector plug housing, the contact element being elastically mounted and/or positioned with an elastomer element in the receiving chamber of the plug connector plug housing. The invention further relates to a plug connector comprising such a plug connector plug.

20 Claims, 3 Drawing Sheets

(58) Field of Classification Search
USPC ........................................................ 439/733.1
See application file for complete search history.

(56) References Cited

U.S. PATENT DOCUMENTS

| | | | | |
|---|---|---|---|---|
| 5,906,520 | A * | 5/1999 | Frinker | H01R 13/2421 439/841 |
| 6,431,912 | B1 * | 8/2002 | Mori | H01R 13/2421 439/587 |
| 6,478,619 | B1 * | 11/2002 | Wiechmann | H01R 13/533 439/587 |
| 7,070,458 | B2 * | 7/2006 | Axenbock | H01R 13/2421 439/700 |
| 8,398,419 | B2 * | 3/2013 | Coyle, Jr. | H01R 13/59 439/275 |
| 8,851,937 | B2 * | 10/2014 | Kawai | H01M 50/296 439/754 |
| 9,865,964 | B2 * | 1/2018 | Hashimoto | H01R 13/5205 |
| 9,941,617 | B2 * | 4/2018 | Spitzenberger | H01R 13/04 |
| 9,948,025 | B2 * | 4/2018 | Hashimoto | H01R 13/533 |
| 10,404,010 | B2 * | 9/2019 | Berrocal | B25J 19/0033 |
| 11,128,088 | B2 * | 9/2021 | Shinyama | H01R 13/521 |
| 2011/0059659 | A1 * | 3/2011 | Matsumoto | H01R 13/426 439/733.1 |
| 2016/0294111 | A1 * | 10/2016 | Kobayashi | H01R 13/187 |
| 2018/0316139 | A1 * | 11/2018 | Berrocal | B25J 19/0033 |
| 2019/0181596 | A1 * | 6/2019 | Szymura | H01R 13/04 |
| 2021/0057846 | A1 * | 2/2021 | Lai | H01R 13/62 |

FOREIGN PATENT DOCUMENTS

| | | | | |
|---|---|---|---|---|
| DE | 19936425 | A1 | 3/2000 | |
| DE | 102010040335 | A1 | 3/2012 | |
| DE | 102012102837 | A1 | 10/2012 | |
| DE | 102012215954 | A1 | 3/2014 | |
| DE | 202015001331 | U1 | 4/2015 | |
| DE | 102014108285 | A1 | 12/2015 | |
| GB | 975395 | A | 11/1964 | |
| WO | WO-2012121061 | A1 * | 9/2012 | H01R 13/426 |
| WO | 2020070187 | A1 | 4/2020 | |

* cited by examiner

PLUG CONNECTOR PLUG HAVING AN INCREASED VIBRATORY STRENGTH

CROSS REFERENCE TO RELATED APPLICATIONS

This application is a National Stage Application of PCT/EP2022/056687, filed Mar. 15, 2022, which claims priority to German Patent Application Serial No. 102021107308.1, filed Mar. 24, 2021, both of which are incorporated by reference in their entirety herein.

FIELD

The disclosure relates to a plug-connector plug for a plug connector with increased vibratory strength, having a plug-connector plug housing with at least one contact element incorporated in a receptacle space of the plug-connector plug housing. The disclosure furthermore relates to a plug connector with a plug-connector plug.

BACKGROUND

The plug-connector technology is used in practically all environments in terms of requirements and applications, for example in automotive engineering, stationary technology, in the environment of aggressive media, high temperature fluctuations or else moist conditions. The electrical outputs to be transmitted may lie in the range from low-voltage applications up to high-voltage applications.

Generic plug connectors in terms of their contacting task of implementing an electrically conducting connection are embodied in such a manner that the plugs thereof are constructed so as to be compatible with a complementary mating plug. The mutual plugging of the plug and the mating plug is facilitated, whereby the mating plug often has a mating-plug housing made of plastics material and the plug-in contact attached thereto for fastening to the contact part of the plug.

Further requirements may be added to the actual functional tasks of plug connectors. Significant in this context is the ability of the plug connection and of the electrical contacting of the contacts to always reliably establish contact without limitations even under various environmental influences acting on the plug connection, such as, for example, temperature fluctuations, vibrations, mechanical stresses, etc. On top of this, there may also be requirements in terms of sealing, moisture-resistant encasing, depending on the location where the plug connection is to be used.

In general, contacts have at least one electrically conductive contact portion for the releasable, temporary or plug-in connection to a corresponding mating contact element, and a shank portion for fastening an electric line to the contact, said shank portion adjoining the contact portion.

Such a contact, plug-in contact, high-current contact can be used on a charging plug or a charging socket, for example for charging an electrically driven vehicle. In this case, a cable is connected to a charging station, on the one hand, and on the other hand supports a plug-connector part in the form of a charging plug which can be plugged into an assigned mating-plug connector part in the form of a charging socket on a vehicle, so as to in this way establish an electric connection between the charging station and the vehicle.

In principle, charging currents can be transmitted as direct currents or as alternating currents, whereby in particular charging currents and high-current ranges in the form of direct current have a high amperage, for example more than 200 A, or even more than 300 A or even 350 A, and may lead to the cable as well as a high-current contact connected to the cable being heated.

Vibrations and other, in particularly dynamically changing, mechanical stress situations are particularly often the cause of component failure of the contact-relevant components in plug connection, with the consequence that the electric contact is interrupted and the function is disturbed. Vibration-related damage can occur immediately or briefly, depending on the manifestation of the vibrations, or diminish the fatigue limit.

In order to solve the set of issues in terms of vibrations in plug-contact connections, DE 10 2017 103 903 A1 proposes a plug connection with a plug assembly which has a connection part which is elastically decoupled from a receptacle device in that the fastening part comprises vibration-damping material. This means that the plug connection as an entity is elastically decoupled from vibration stresses.

Fastening technology in the case of dynamic loads often uses damping elements in the form of rubber disks, or couples vibration-sensitive components by way of fastening elements with an elastic layer, for example known under the Silentblock name.

SUMMARY

It would be desirable to refine plug connectors and design the latter so as to be more resistant in terms of vibration-related stresses and the influence of other static and/or dynamic mechanical forces, and to improve the functionality and the reliability of the electric contact of the plug connection.

In order to achieve this, the disclosure proposes an elastomer component in the form of an elastomer sleeve which elastically mounts, i.e. positions, the contact socket and/or the contact pin in a plug-contact plug. The disclosure recognizes that the suitable design embodiment of the elastomer component is capable of at least reducing loads due to vibration and/or shaking, and in this way to reduce the wear and/or abrasion between the contact pin and the contact socket. This is achieved in that the relative movement between the contact elements, contact partners, i.e. the contact pin and the contact socket, is reduced as a result of the damping effect of the elastomer component, this leading to a reduction in the oscillation amplitude of the vibratory movement. This results above all in a reduction of wear of the contact partners on their mutual contact faces, and potentially also on their respective contact faces with the plug-connector housings, the service life being increased in this way. In this way, the preservation of the function of the plug connection is facilitated, improved and extended, and the risk of failure, i.e. the risk of consequential damage, due to vibratory stress is reduced.

The disclosure provides the elastomer component in the form of a socket and sizes the dimensions thereof in relation to the contact pin or the contact socket encompassed by the elastomer component, and in relation to the plug-connector housing, substantially as a clearance fit. An optimized vibration-damping characteristic can be achieved as a result, which however cannot act in a sealing manner.

The basic form of the elastomer component designed as a socket is capable to absorb and dampen vibratory movements radial to its axis, or to absorb and dampen the radial force components of said vibratory movements. If axial force components are also to be dampened and/or positioning tasks of the contact elements in the axial direction are to be implemented, the disclosure additionally provides further geometric components of the socket, such as, for example, a collar, a socket collar. The geometric design of the socket can also be supplemented by an introduction ramp.

BRIEF DESCRIPTION OF THE FIGURES

The disclosure will be explained in more detail hereunder by way of example by means of an exemplary embodiment in conjunction with the figures in which.

DETAILED DESCRIPTION

Figure 1:
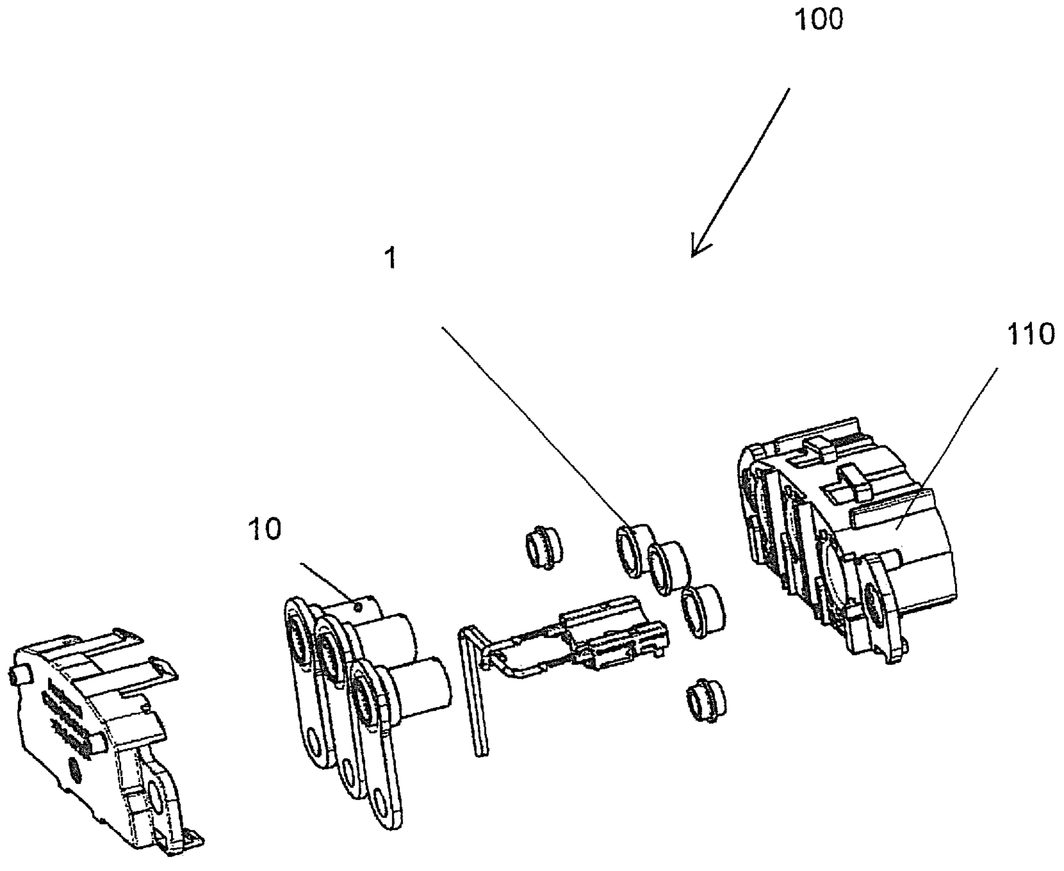
FIG. 1 shows the exploded illustration of a plug-connector plug with a contact socket and an elastomer element.

FIG. 1 shows the exploded illustration of a plug-connector plug 100 with a contact socket 10 and the elastomer element 1. The elastomer element 1 mounts, couples, the contact socket 10 in a vibration-damping, shock-absorbing manner (by way of example, three contact sockets are installed in the exemplary embodiment shown; however, the disclosed can be used regardless of the number of contact elements). In order for the damping and/or absorbing characteristics of the coupling to be maximized, the three components participating in the coupling, i.e. the contact socket 10, the receptacle bore for the contact socket 10 in the plug-connector plug housing 1100, and the elastomer element 1 are sized with a generous mutual clearance fit. A sealing function cannot be implemented in this way, but the mutual relative movement of the components, which is essential for the vibration-damping effect, and the elastic deformation of the elastomer element 1 are facilitated.

Figure 2:
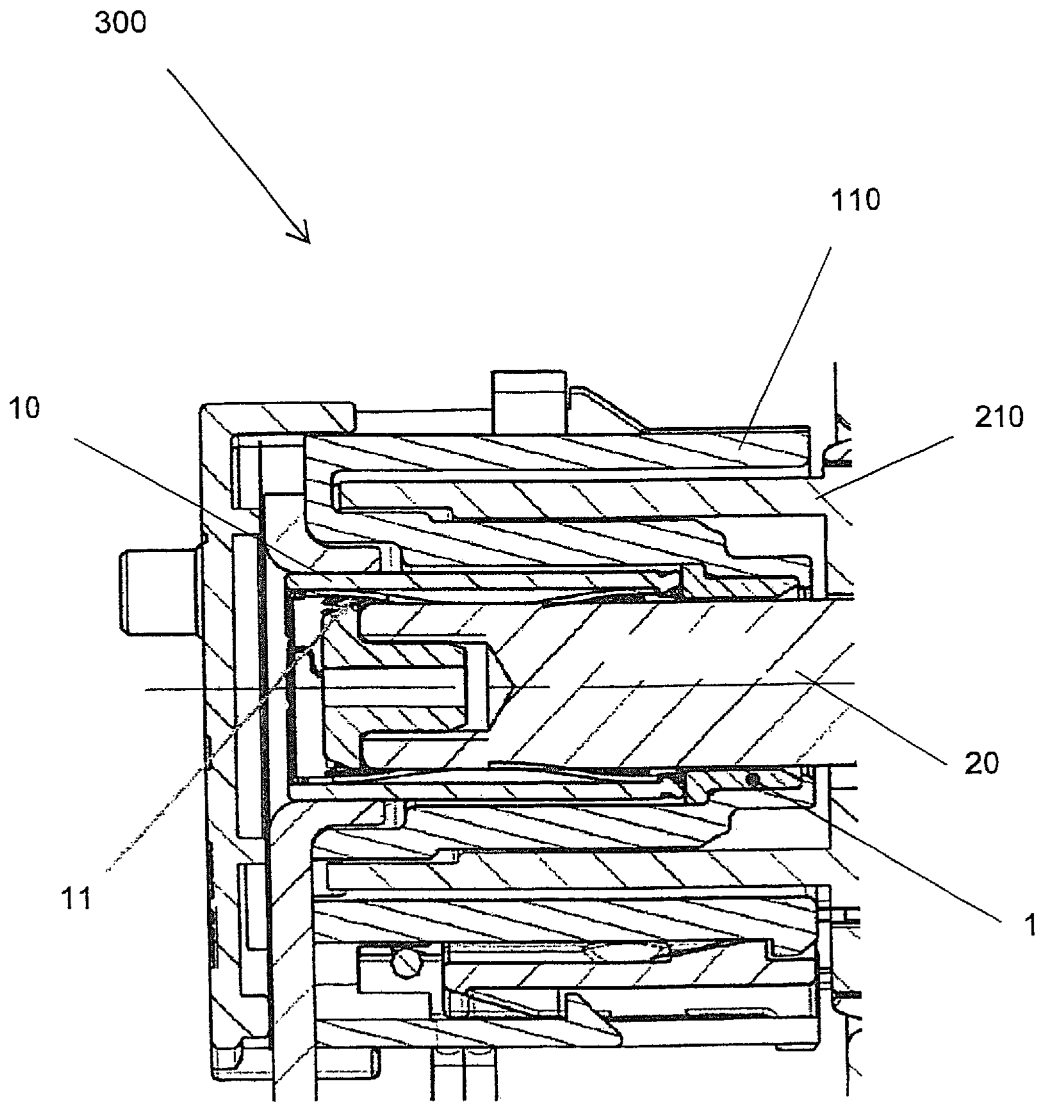
FIG. 2 shows the sectional view of the plugged-in plug connector.

FIG. 2 comprises the sectional view of the plugged-in plug connector 300, i.e. of the plug-connector plug housing 110 and the plug-connector mating-plug housing 210 plugged into one another, in such a manner that the contact partners, presently in the form of the contact socket 10 and the contact pin 20, are disposed in a contacting and electrically conducting manner. The electrical contacting takes place by way of socket contact elements 11 which bear on the contact pin 10 and as a result of their elastic deformability permit relative movements between the contact socket 10 and the contact pin 20.

When viewed in the plug-in direction, the elastomer element 1 is disposed in front of the contact socket 10. Said elastomer element 1 spaces apart the contact socket 10 and the contact pin 20 from one another and, besides the elastically deformable socket contact element 11, implements the second elastically deformable contact-face pairing between the contact socket 10 and the contact pin 20. As a result, the mutual relative movement of the contact partners is possible, and is protected in terms of vibration-damping and/or shock-absorbing by the elastomer element 1.

Figure 3:
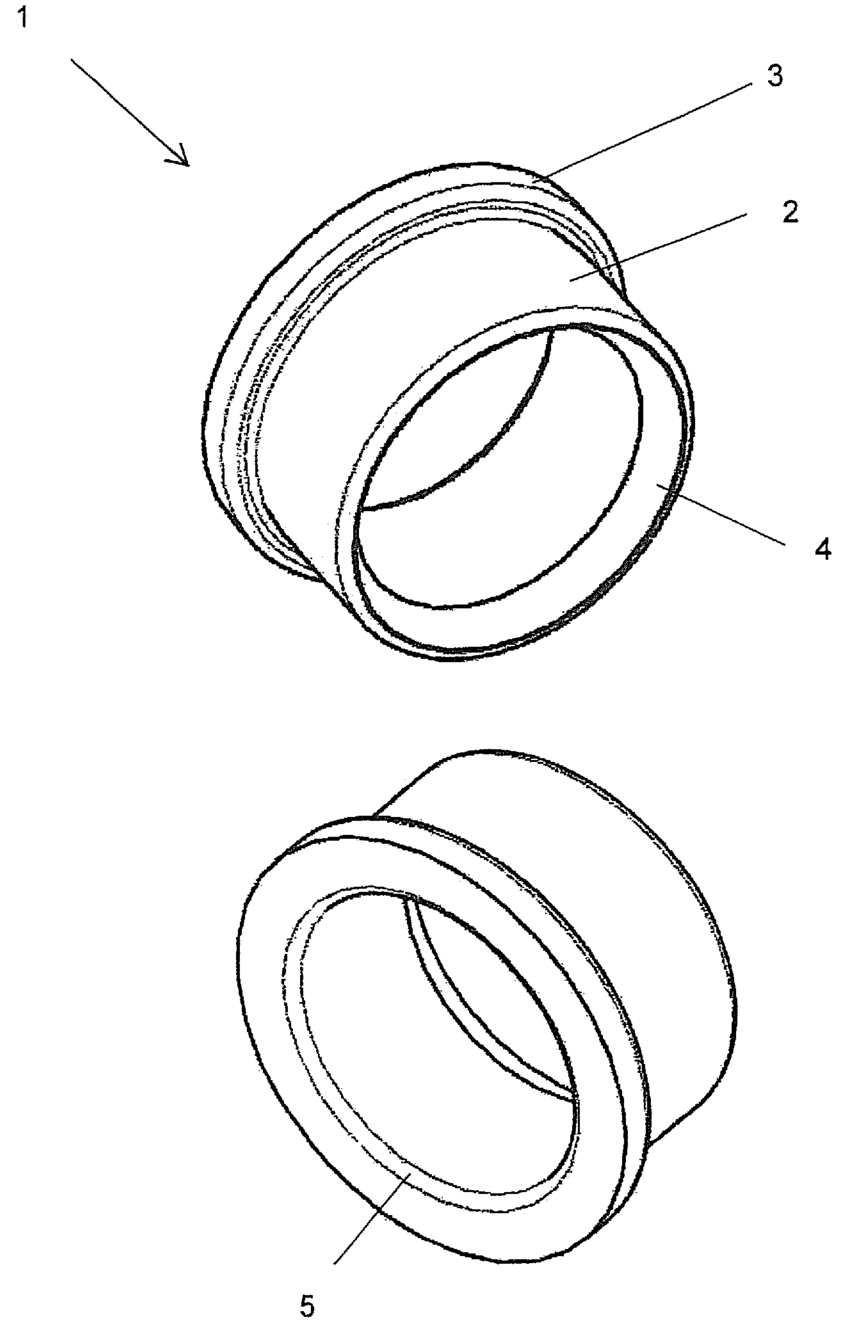
FIG. 3 in perspective views from two directions shows the single-part drawing of the elastomer element.

FIG. 3 in two perspective views from two directions illustrates the single-part drawing of the elastomer element 1. The exemplary embodiment shown possesses a cylindrical main body 2 which forms the shank of the elastomer element 1. The design of the elastomer element 1 with a collar 3 is possible and illustrated here. The collar 3 is advantageous in particular if the contact socket 10 on the end side thereof is to be provided with a concentric annular face as a bearing shoulder. The vibration-damping and/or shock-absorbing effect can yet again be reinforced in this way. The external diameter of the collar 3 is adapted to the receptacle bore of the contact socket 10 in the plug-connector plug housing 110. A ratio between the external diameter of the collar 3 and of the cylindrical main body 2 of approximately 1.1 to 1.2 is often implemented.

In order to facilitate simple and easy assembling, it is provided that the elastomer element 1 on the inside of the cylindrical main body 2 and at the end of the cylindrical main body 2 that lies opposite the collar 3 has an introduction ramp 4 so that the contact pin 20 can be more easily introduced into the contact socket 10. The elastomer element 1 can be supplemented with a chamfer 5. The chamfer 5 is produced by an incline of approximately 45 degrees and extends over approx. 1/10 of the length of the cylindrical main body 2. The introduction ramp 4 is produced by an incline of approximately 15 degrees and extends over approx. 1/5 of the length of the cylindrical main body 2.

LIST OF REFERENCE SIGNS

1 Elastomer element
2 Cylindrical main body
3 Collar, socket collar
4 Introduction ramp
5 Chamfer
10 Contact socket
11 Socket contact element
20 Contact pin
100 Plug-connector plug
110 Plug-connector plug housing
210 Plug-connector mating-plug housing
300 Plug connector

The invention claimed is:

1. A plug-connector plug for a plug connector with increased vibratory strength, the plug-connector plug comprising:

a plug-connector plug housing defining a receptacle space;

at least one contact element arranged in the receptacle space of the plug-connector plug housing, wherein the at least one contact element is configured to electrically connect a contact socket to a contact pin within the receptacle space; and at least one elastomer element configured to elastically mount and/or position the at least one contact element in the receptacle space of the plug-connector plug housing, and wherein the at least one elastomer element is positioned to space apart the contact socket and the contact pin when the contact socket is electrically engaged with the contact pin via the at least one contact element, wherein at least one the elastomer element is formed by a cylindrical main body, and the at least one elastomer element comprises a collar at one end of the cylindrical main body.

2. The plug-connector plug as claimed in claim 1, wherein the collar comprises a chamfer defined on an inner diameter surface thereof.

3. The plug-connector plug as claimed in claim 1, wherein a mutual clearance fit is defined by the arrangement of the at least one elastomer element, the receptacle space, and the contact element.

4. A plug connector for implementing a releasable electrically conducting connection, having a plug-connector plug as claimed in claim 1.

5. The plug-connector plug as claimed in claim 2, wherein the chamfer extends over approximately 1/10 of a length of the cylindrical main body.

6. The plug-connector plug as claimed in claim 2, wherein the chamfer defines an incline of approximately 45 degrees.

7. The plug-connector plug as claimed in claim 1, wherein the cylindrical main body comprises an introduction ramp arranged at an end of the cylindrical main body opposite the collar.

8. The plug-connector plug as claimed in claim 7, wherein the introduction ramp has an incline of approximately 15 degrees.

9. The plug-connector plug as claimed in claim 7, wherein the introduction ramp extends over approximately ⅕ of a length of the cylindrical body.

10. The plug-connector plug as claimed in claim 1, wherein the collar is defined at a first end of the cylindrical main body, and wherein the cylindrical main body further comprises:

an introduction ramp at a second end opposite the first end.

11. The plug-connector plug as claimed in claim 10, wherein:

the collar comprises a chamfer that extends over approximately 1/10 of a length of the cylindrical main body; and the introduction ramp extends over approximately ⅕ the length of the cylindrical main body.

12. The plug-connector plug as claimed in claim 10, wherein each of the chamfer and the introduction ramp are formed on an inner diameter surface of the cylindrical main body.

13. The plug-connector plug as claimed in claim 1, wherein a number of elastomer elements is equal to a number of contact elements within the receptacle space, and wherein each contact element is elastically mounted and/or positioned by a respective elastomer element.

14. A plug-connector plug for a plug connector with increased vibratory strength, the plug-connector plug comprising:

a plug-connector plug housing defining a receptacle space;

at least one contact element arranged in the receptacle space of the plug-connector plug housing, wherein the at least one contact element is configured to electrically connect a contact socket to a contact pin within the receptacle space; and at least one elastomer element configured to elastically mount and/or position the at least one contact element in the receptacle space of the plug-connector plug housing, and wherein the at least one elastomer element is positioned to space apart the contact socket and the contact pin when the contact socket is electrically engaged with the contact pin via the at least one contact element, wherein the at least one the elastomer element is formed by a cylindrical main body, and wherein the cylindrical main body comprises an introduction ramp arranged at one end of the cylindrical main body.

15. The plug-connector plug as claimed in claim 14, wherein the introduction ramp has an incline of approximately 15 degrees.

16. The plug-connector plug as claimed in claim 14, wherein the introduction ramp extends over approximately ⅕ of a length of the cylindrical body.

17. The plug-connector plug as claimed in claim 14, wherein a number of elastomer elements is equal to a number of contact elements within the receptacle space, and wherein each contact element is elastically mounted and/or positioned by a respective elastomer element.

18. A plug connector for implementing a releasable electrically conducting connection, having a plug-connector plug as claimed in claim 17.

19. The plug-connector plug as claimed in claim 14, wherein the at least one elastomer element comprises a collar at an end of the cylindrical main body opposite the introduction ramp.

20. The plug-connector plug as claimed in claim 19, wherein the collar comprises a chamfer defined on an inner diameter surface thereof.

* * * * *